United States Patent [19]
Yessik et al.

[11] Patent Number: 5,832,013
[45] Date of Patent: Nov. 3, 1998

[54] INTRACAVITY MODULATED PULSED LASER AND METHODS OF USING THE SAME

[75] Inventors: Michael J. Yessik, Burlingame; Richard G. Thompson, Fairfield, both of Calif.

[73] Assignee: American Dental Technologies, Inc., Southfield, Mich.

[21] Appl. No.: 768,250

[22] Filed: Dec. 17, 1996

Related U.S. Application Data

[63] Continuation of Ser. No. 350,951, Dec. 7, 1994, Pat. No. 5,621,745, Continuation-in-part of Ser. No. 951,075, Sep. 25, 1992, Pat. No. 5,390,204.

[51] Int. Cl.⁶ ........................................................ H01S 3/10
[52] U.S. Cl. .................................. 372/26; 372/10; 372/25
[58] Field of Search ................................ 372/10, 11, 13, 372/25, 26

[56] References Cited

U.S. PATENT DOCUMENTS

| | | |
|---|---|---|
| 3,725,812 | 4/1973 | Scott . |
| 3,962,558 | 6/1976 | Kochev et al. . |
| 4,930,901 | 6/1990 | Johnson et al. ........................ 372/26 |
| 5,001,717 | 3/1991 | Mayer et al. ........................... 372/26 |
| 5,151,909 | 9/1992 | Davenport et al. .................... 372/26 |
| 5,197,074 | 3/1993 | Emmons et al. ....................... 372/26 |
| 5,291,505 | 3/1994 | Nielsen .................................. 372/26 |
| 5,339,323 | 8/1994 | Hunter ................................... 372/26 |

OTHER PUBLICATIONS

Acoustooptic Q switching of erbium lasers, Schnell et al. (IEEE, Jun. 1990, No. 6).

Kinetics of generation and amplification of YAD:ND³⁺ laser radiation in a periodic Q–switched regime with plused pumping, Sov.J.Quantum Electron. 14(5), May 1984.

*Primary Examiner*—Rodney B. Bovernick
*Assistant Examiner*—Robert E. Wise
*Attorney, Agent, or Firm*—Lyon & Lyon LLP

[57] ABSTRACT

An intracavity modulated pulsed laser and methods of using the same. In one preferred form, an intracavity modulated pulsed laser comprises an amplification medium, a pulsed pumping source, a beam modulator, and two mirrors, one totally reflective and one partially reflective for generating at least one laser output burst comprising a plurality of sub-pulses having variably controllable peak powers. In another preferred form, a non-linear crystal is utilized to double the frequency of each laser output burst. In still another preferred form, a fluorescence feedback control circuit is utilized to control the beam modulator.

7 Claims, 12 Drawing Sheets

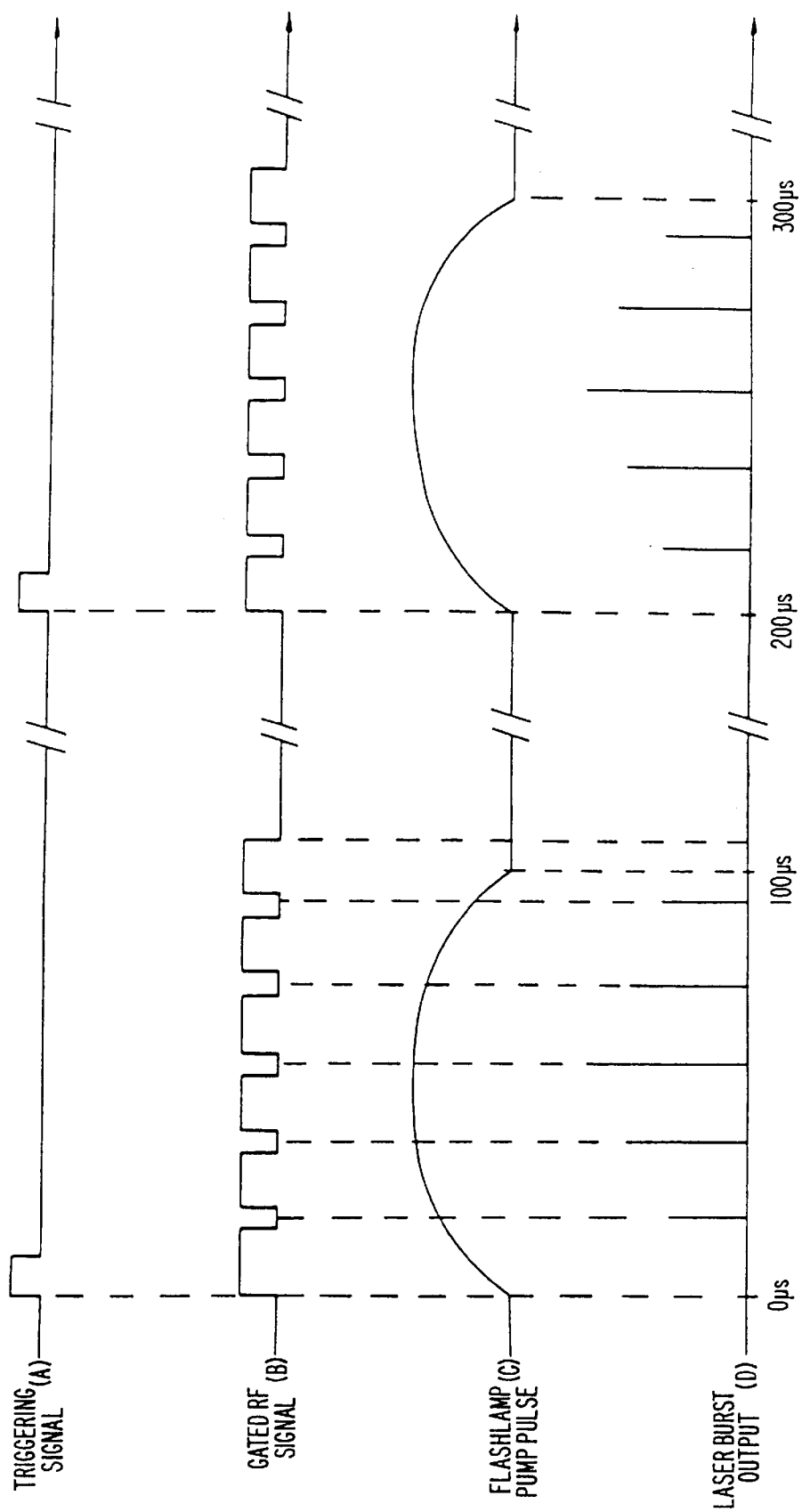

INTRACAVITY MODULATED PULSED LASER AND METHODS OF USING THE SAME

This application is a continuation of application Ser. No. 08/350,951 Dec. 7, 1994, now U.S. Pat. No. 5,621,745, which is a continuation-in-part of application Ser. No. 07/951,075, Sep. 25, 1992 now U.S. Pat. No. 5,390,204, which is incorporated herein by reference.

BACKGROUND OF THE INVENTION

The field of the present invention is lasers and their methods of use, and more particularly, pulsed lasers and their use in medical, dental, and industrial applications.

Recently, a number of pulsed lasers have been developed for use in medical, dental, and industrial applications. For example, those skilled in the art will note that pulsed laser systems are commonly provided in three forms: flashlamp pumped free-running, flashlamp pumped electro-optically (E-O) Q-switched, and continuously pumped acousto-optically (A-O) Q-switched. Further, it will be noted by those skilled in the art that the neodymium doped yttrium aluminum garnet (Nd:YAG) laser, a laser which has been adapted for use in numerous medical and dental applications, is exemplary of pulsed laser systems.

When the Nd:YAG laser is provided as a flashlamp pumped free-running system, a flashlamp pulse having a duration typically between 100 and 1000 $\mu s$ pumps the Nd:YAG rod of the laser, and a laser output pulse of approximately the same duration is produced. Flashlamp pumped laser pulse energies are commonly in the 1–1000 mJ range, and for this reason the maximum peak laser output power of a flashlamp pumped free-running system is typically 10 kW.

For certain applications, however, those skilled in the art will note that peak output powers greatly exceeding 10 kW may be desired, and that, in response to this need, a number of flashlamp pumped E-O Q-switched Nd:YAG lasers have been developed. The flashlamp pumped E-O Q-switched Nd:YAG laser utilizes an electro-optical Q-switch to disrupt beam oscillation within the oscillating cavity of the laser during the entire duration of each flashlamp pulse, and to restore beam oscillation immediately following each flashlamp pulse. In this fashion, substantially all of the flashlamp pulse energy is stored in the Nd:YAG rod during the duration of each flashlamp pulse, and upon the restoration of beam oscillation within the oscillating cavity a "giant pulse" laser output is produced. More specifically, as beam oscillation is restored, substantially all of the energy stored within the Nd:YAG rod is extracted from the rod in the form of a single giant pulse having a duration of approximately 10 ns. In this way, laser output pulses having peak powers in the range of 100 MW may be readily produced. Unfortunately, laser output pulses having peak powers in the 100 MW range are not useful in many applications, and in particular, laser output pulses having peak powers in 100 MW range cannot be carried by conventional fiber optic delivery systems. While laser output pulses having lower peak powers may be obtained from a flashlamp pumped E-O Q-switched Nd:YAG laser by reducing the amount of energy contained in each flashlamp pump pulse, the difficulty of operating E-O Q-switches at high repetition rates (i.e. 100 Hz or better) makes it impractical to achieve desirable peak powers while at the same time maintaining an average laser output power of between 5 and 50 W.

Finally, in contrast to flashlamp pumped Nd:YAG pulsed lasers, continuously pumped A-O Q-switched Nd:YAG pulsed lasers, such as the laser disclosed and claimed in U.S. Pat. No. 4,273,535, issued to Yamamoto et al., and entitled "Device for Preventing Tooth Decay by Laser Beam Irradiation and Method of Preventing Tooth Decay by Means of the Same," typically utilize an arc lamp to continuously pump the Nd:YAG rod, and utilize an A-O Q-switch to periodically trigger energy storage and release by the Nd:YAG rod. The storage time and pulse repetition rate can be adjusted over a broad range. However, to maximize laser output pulse peak powers it is necessary to maximize energy storage within the Nd:YAG rod prior to switching. This is accomplished by setting the rate of triggering in accordance with the lifetime of the excited state of the Nd:YAG rod. However, those skilled in the art will appreciate that, as the pulse repetition rate is reduced, the efficiency of a conventional laser is sacrificed, and the average power generated by the laser decreases. If on the other hand, the pulse repetition rate is increased, the peak powers generated by the conventional laser will decrease, thus inhibiting any increases in the average power of the laser. For these reasons, it is impractical using conventional laser systems to generate laser output pulses having desirable peak powers, while at the same time maintaining an average laser output power in the range of 5–50 W.

Because it is desirable in many applications to generate laser output pulses having peak powers in the 10–1000 kW range, while at the same time maintaining laser efficiency of 1 to 2% or more and maintaining a pulse repetition rate in the range of 10–200 Hz, a new laser system is desired.

SUMMARY OF THE INVENTION

The present invention is directed to an intracavity modulated pulsed laser and its use. The intracavity modulated pulsed laser is capable of generating output pulses having controllable peak powers in, for example, the 10–1000 kW range, is capable of maintaining a high average power output, and is capable of delivering laser radiation in the form of low frequency bursts. In one preferred form, the intracavity modulated pulsed laser comprises an amplification medium, a pulsed pumping source, a modulator, and two mirrors, one totally reflective and one partially reflective. The amplification medium is disposed along an optical axis between the two mirrors. The pulsed pumping source, which may comprise, for example, a standard flashlamp, is disposed adjacent the amplification medium for delivering pulses of pump energy to the amplification medium and exciting the atoms which comprise the amplification medium to elevated quantum-mechanical energy levels. The intracavity modulator modulates the amplification of a beam oscillating between the mirrors at predetermined intervals during each pulse of energy delivered to the amplification medium by the pulsed pumping source. In this fashion, rather than generating a conventional single laser output pulse in response to each pump pulse delivered by the pumping source, the intracavity modulated pulsed laser generates an output burst comprising a plurality of sub-pulses in response to each pump pulse delivered by the pumping source. Further, when a plurality of pump pulses are sequentially delivered from the pulsed pumping source to the amplification medium, the intracavity modulated pulsed laser of the present invention will produce an output comprising a plurality of grouped sub-pulses or, stated differently, a plurality of multi-pulsed bursts. The sub-pulses of each output burst have substantially increased and controllable peak powers. To control the peak powers of the sub-pulses comprising each burst, the triggering frequency of modulation (or stated differently, the modulation gating interval) is varied. As long as the duration of the period between amplification triggering does not approach the lifetime of the excited state of the amplification medium, the efficiency of the intracavity modulated pulsed laser is not sacrificed.

It follows that the intracavity modulated pulsed laser embodying a preferred form of the present invention is both efficient and capable of generating an output comprising a plurality of multi-pulsed bursts having substantially increased and controllable peak powers. Further, because the peak powers of the multi-pulsed bursts are controllable, compatibility between a laser embodying a preferred form of the present invention and fiber optic delivery systems may be readily achieved. More specifically, by varying the modulation gating frequency (or modulation gating interval) of an intracavity modulated pulsed laser, the maximum peak powers of the output bursts generated by the laser may be controlled in accordance with the power tolerance (power density damage threshold) of various fiber optic delivery systems.

Further, because the peak powers of the sub-pulses comprising each multi-pulsed burst are controllable and may be set to a selected, uniform level, a laser in accordance with the present invention provides numerous advantages in applications requiring second-harmonic beam generation or frequency doubling. For example, in a conventional laser system the efficiency of conversion from a fundamental beam frequency to a second harmonic frequency will vary proportionally with the peak power density of the fundamental beam. Also, when the average power of a conventional laser system is changed or when the pulse repetition rate of that laser system is changed, the peak powers generated by that system also change. In contrast, where a laser in accordance with the present invention is utilized to generate a plurality of multi-pulsed burst outputs, and each burst comprises a plurality of sub-pulses of selected, uniform peak power, the conversion efficiencies relating to the respective sub-pulses will vary only minimally and will remain essentially constant. This holds true even over a broad range of average powers and burst repetition rates.

Accordingly, it is an object of the present invention to provide an improved laser which is both efficient and capable of delivering an output comprising a plurality of output bursts, each comprising a plurality of sub-pulses having substantially increased and controllable peak powers.

It is a further object of the present invention to provide for utilization in medical, dental, and industrial applications an improved laser which is capable of efficiently generating an output comprising a plurality of output bursts having controllable peak powers.

It is still another object of the present invention to provide a method for treating, e.g. cutting, ablating, and coagulating, soft tissues using multi-pulsed bursts of laser energy.

It is yet another object of the present invention to provide a method for treating hard tissues using multi-pulsed bursts of laser energy.

BRIEF DESCRIPTION OF THE DRAWINGS

FIG. 5 is a timing diagram illustrating the relationship between flashlamp triggering, RF signal gating, flashlamp discharge, and laser output in an intracavity modulated pulsed laser in accordance with a preferred form of the present invention.

DESCRIPTION OF THE PREFERRED EMBODIMENTS

Figure 1:
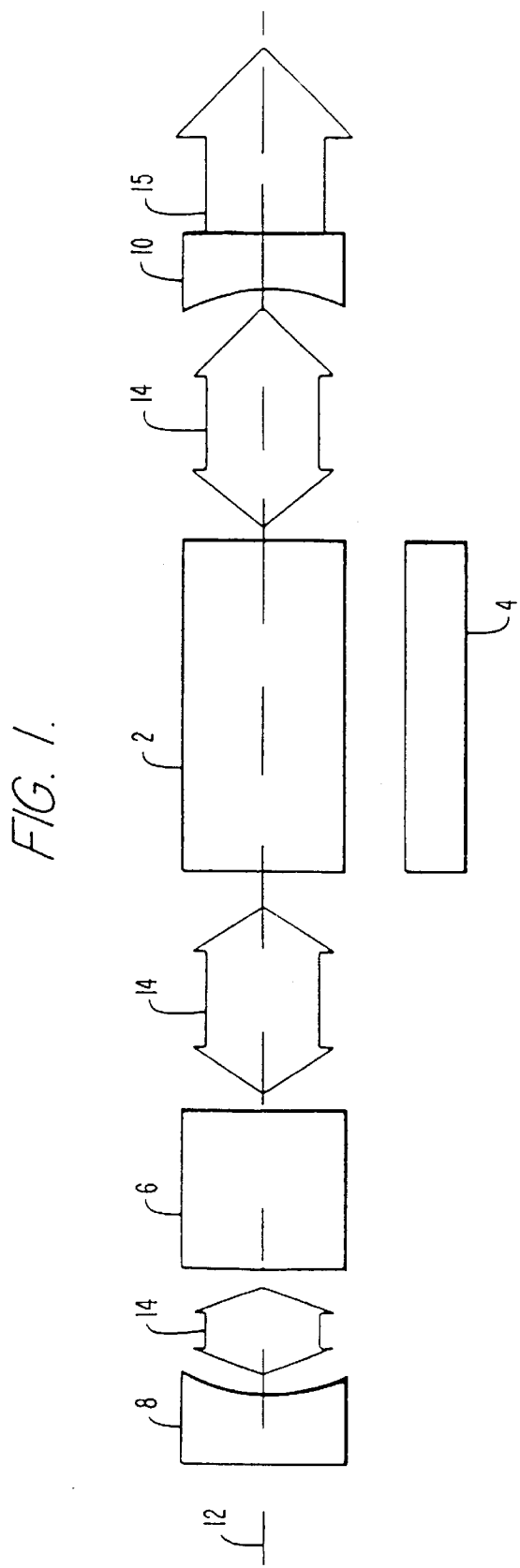
FIG. 1 is a block diagram of an intracavity modulated pulsed laser in accordance with one form of the present invention.

Turning to the drawings, FIG. 1 is a block diagram of an intracavity modulated pulsed laser 1 in accordance with the present invention. As shown, the laser 1 comprises an amplification medium 2, a pulsed pumping source 4, a modulator 6, a totally reflective mirror 8, and a partially reflective mirror 10. The amplification medium 2 is disposed along an optical axis 12 between the two mirrors 8 and 10, and the pulsed pumping source 4, which may comprise, for example, a conventional flashlamp, is disposed adjacent the amplification medium 2 for delivering pulses of pump energy to the amplification medium 2 and exciting the atoms which comprise the amplification medium 2 to elevated quantum-mechanical energy levels. As the atoms comprising the amplification medium return to their initial or lower quantum-mechanical energy levels, photons of predetermined wavelengths will be spontaneously emitted by those atoms, and a number of the spontaneously emitted photons will trigger further photon emissions ("stimulated emissions"). A number of the stimulated emissions will then form a beam 14 which oscillates between the mirrors 8 and 10. Finally, the oscillation of the beam 14 between the mirrors 8 and 10 will trigger further stimulated emissions which will cause the beam 14 to be amplified.

Figure 2:
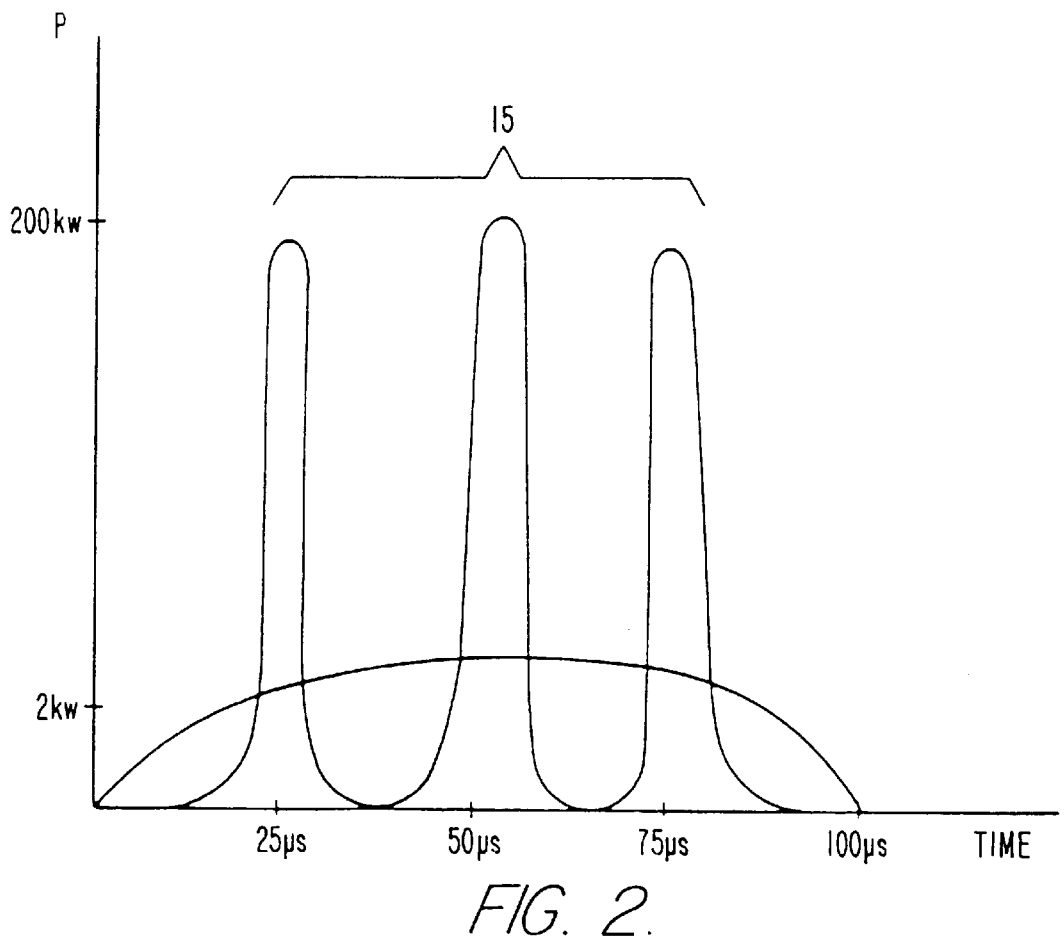
FIG. 2 illustrates the relationship between a conventional flashlamp pump pulse and a burst output which may be produced therefrom in accordance with the present invention.

The modulator 6, which may comprise for example an acousto-optical Q-switch or a saturable absorber dye, is also disposed along the optical axis 12 between the mirrors 8 and 10. The modulator 6 functions to reduce stimulated emissions within the amplification medium (i.e. to minimize lasing or amplification of the beam 14 as it travels within the amplification medium) by disrupting the oscillation of the beam 14 between the mirrors 8 and 10. This process is commonly referred to as switching the quality or "Q" of a laser oscillator. The modulator 6 also functions to increase the Q of the laser 1 at predetermined intervals within each pulse of energy generated by the pulsed pumping source 4, thus causing oscillation and amplification of the beam 14 at each such interval. By repeatedly modulating the oscillating beam 14 of the laser 1 during each energy pulse generated by the pulsed pumping source 4, substantial population inversions are repeatedly built up within the amplification medium 2, and highly accelerated depletions of those inversions are triggered upon increasing the Q of the laser 1. In this manner, a laser output 15 comprising one or more multi-pulsed bursts having peak powers in the range of 10–1000 kilowatts may be readily generated. Further, as long as the interval between the sub-pulses comprising each multi-pulsed burst does not approach the lifetime of the excited state of the amplification medium 2 of the laser 1, spontaneous emission energy losses will be minimized, and the efficiency of the laser 1 will not be sacrificed. The relationship between a typical flashlamp pump pulse 11 and an exemplary multi-pulsed burst laser output 15 which may be produced therefrom is illustrated in FIG. 2.

Figure 3:
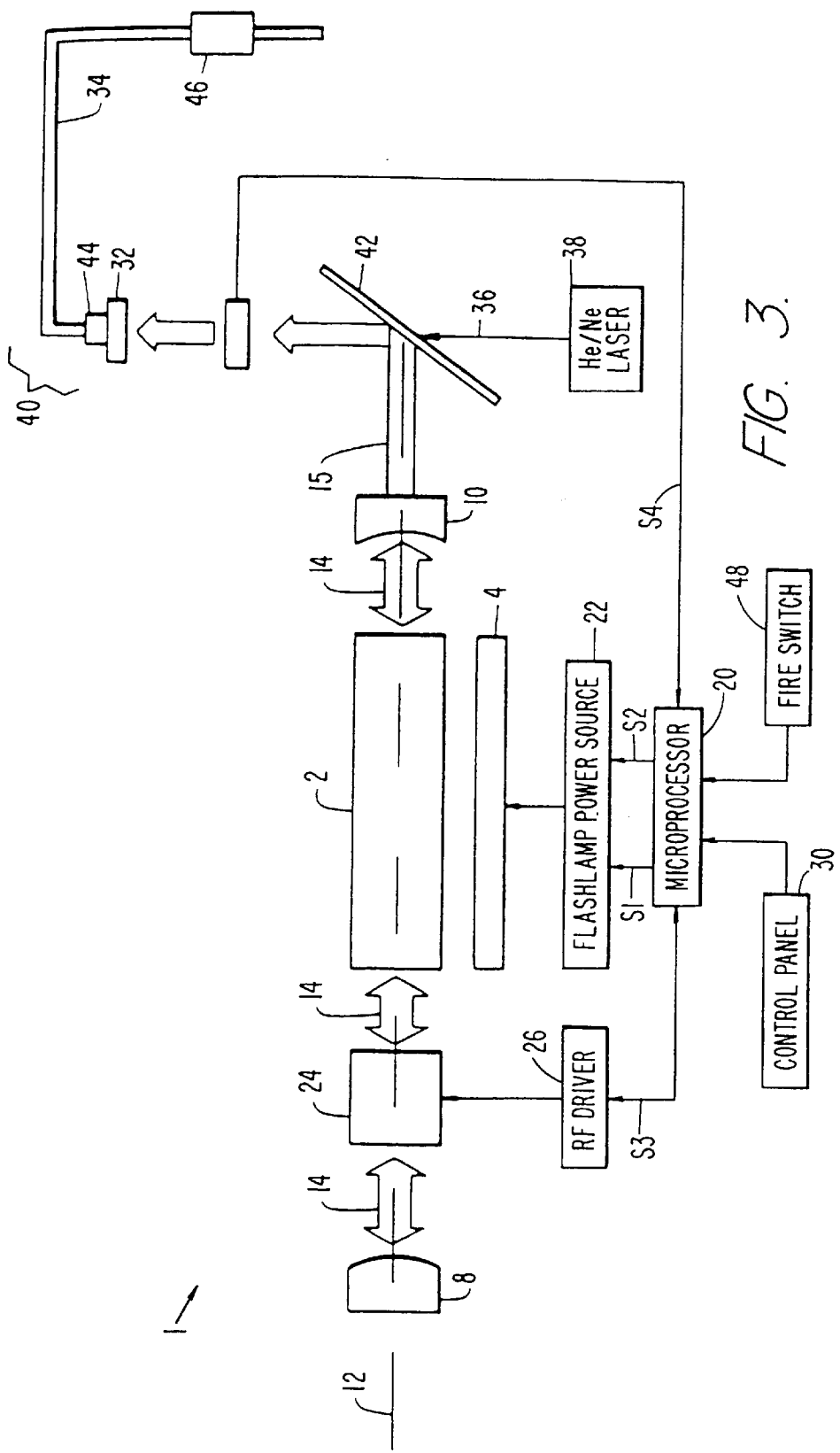
FIG. 3 is a block diagram of an intracavity modulated pulsed laser in accordance with a preferred from of the invention.

Turning now to FIG. 3, in a preferred form the amplification medium 2 of the intracavity modulated pulsed laser 1 comprises a standard, 1% neodymium doped, yttrium aluminum garnet rod (Nd:YAG rod) measuring 5 mm in diameter and 80 mm in length. The dimensions of the Nd:YAG rod will vary, however, depending upon the average power output and depending upon the particular beam diameter which is desired from the laser 1. It will also be noted that Nd:YAG rods of the type described may be purchased from any one of a number of laser component distributors including Lightning Optical of Tarpon Springs, Fla. Further, it is presently preferred to apply a single layer anti-reflective (AR) coating to the ends of the Nd:YAG rod. The AR coating may be centered at any one of a number of wavelengths including, for example, 1.064 $\mu$m, 1.320 $\mu$m, and 1.440 $\mu$m, depending upon the anticipated field of use of the laser 1. Although testing is ongoing, the 1.064 $\mu$m and the 1.320 $\mu$m wavelengths have demonstrated utility in hard and soft tissue applications. The utilization of amplification mediums other than neodymium doped yttrium aluminum garnet crystal may require the utilization of AR coatings centered at other wavelengths. For example, it might be desirable to coat the ends of an erbium doped yttrium aluminum garnet rod with an AR coating centered at 2.910 $\mu$m.

With respect to the pulsed pumping source 4, a 450 Torr Xenon flashlamp is presently preferred. Flashlamps of this type are available from ILC, Inc., of Sunnyvale, Calif., and the ILC Model L7652 is preferred. The energy delivered to the Nd:YAG rod 2 by the flashlamp 4 is controlled by a microprocessor 20 which is coupled to the flashlamp power source 22. The microprocessor 20 may comprise, for example, an Intel Model 8031 with EEPROM, and as illustrated, the microprocessor 20 delivers two signals S1 and S2 to the flashlamp power source 22. The first signal S1 controls the amount of energy which is delivered from the power source 22 to the flashlamp 4 and, in turn, the amount of energy which is delivered from the flashlamp 4 to the Nd:YAG rod 2. The second signal S2 triggers the discharge of the flashlamp power source 22 and, thus, controls the timing or repetition rate of the pulses generated by the flashlamp 4.

Figure 4:
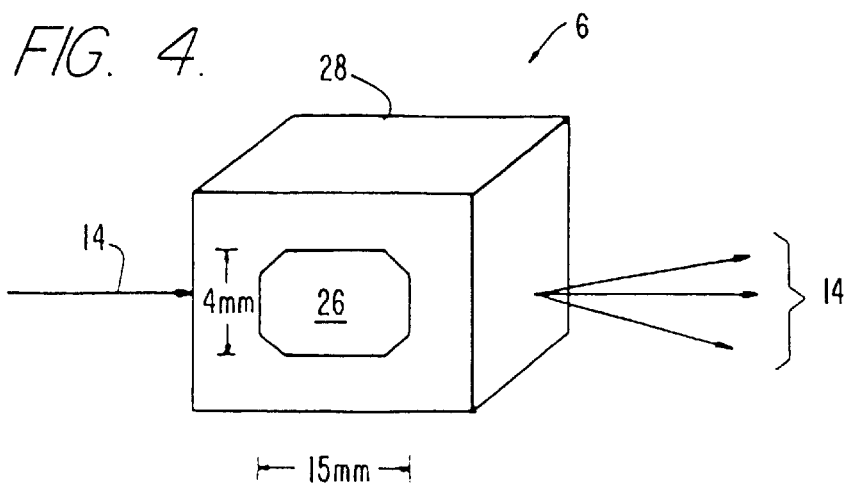
FIG. 4 is an illustration of an acousto-optical Q-switch in accordance with a preferred form of the present invention.

Referring now also to FIG. 4, in a preferred form the beam modulator 6 of the intracavity modulated pulsed laser 1 comprises an acousto-optical Q-switch 24. In particular, it is presently preferred to use an acousto-optical Q-switch comprising a lithium niobate (LiNbO$_3$) transducer 26 bonded to an SF10 glass crystal 28. Acousto-optical Q-switches of this type may be purchased, for example, from Neos, Inc., of Melbourne, Fla. However, it should be noted that numerous other acousto-optical Q-switches, including standard quartz switches, may be utilized. Further, while it is generally accepted that the acoustic aperture of the crystal 28 should match the diameter of the oscillating beam 14, it has been found that the acousto-optical Q-switch 24 operates more efficiently if a slightly smaller acoustic aperture is used. An acoustic aperture measuring 4 mm by 15 mm is presently preferred.

Turning now also to the timing diagram depicted in FIG. 5, the modulator 6 is preferably driven at a frequency of 27.12 Mhz by a RF driver 26. RF drivers capable of sustaining a 27.12 Mhz drive frequency at 10 watts peak power are available, for example, from Neos, Inc., of Melbourne, Fla. The initial activation and gating of the RF driver 26 is preferably controlled by the microprocessor 20. For example, as shown in FIG. 5, in each instance that the microprocessor 20 delivers a trigger signal S2 (shown as waveform A) to the flashlamp 4 causing the flashlamp 4 to discharge a pump pulse 11, the microprocessor simultaneously delivers an RF driver signal S3 (shown as waveform B) to the RF driver 26 and the RF driver signal S3 switches (or gates) the RF driver ON and OFF at predetermined intervals during the period of the flashlamp pump pulse 11 (shown as waveform C). In one preferred form, the period of the flashlamp discharge pulse 11 is approximately 100 $\mu$s, and the gating frequency of the RF driver signal S3 is set between 10 kHz and 300 kHz. Thus, a laser output 15 (shown as waveform D) comprising a multi-pulsed burst of between 2 and 50 sub-pulses is produced from each flashlamp pump pulse 11. Importantly, by varying the gating frequency of the RF driver signal S3, it is possible to control the peak powers of the multi-pulsed bursts which comprise the laser output 15. For this reason, the gating frequency of the RF driver signal S3 is controlled by the microprocessor 20. More specifically, the microprocessor 20 determines an optimum gating frequency (or optimum gating intervals) based on preset peak power and gating information which is stored in its memory. The optimum gating frequency of the preferred embodiment is the frequency at which the peak power of the largest sub-pulse in a multi-pulsed burst attains a prescribed threshold level L1 just below the power density damage threshold level DT of a fiber optic delivery system 40 used in conjunction with the intracavity modulated pulsed laser 1. However, it should be understood that the gating frequency of signal S3 need not remain constant over the duration of a flashlamp pump pulse. Thus, in accordance with the present invention optimum gating intervals may be established such that the peak powers of the sub-pulses comprising each multi-pulsed burst do not exceed the damage threshold of an associated laser delivery system.

In another preferred form, the microprocessor 20 will still be used to trigger the flashlamp pulse and turn on the RF driver. However, in this instance the gating of the RF driver (i.e. the modulator) is controlled through the microprocessor 20 by a real-time feedback circuit (described below with reference to FIGS. 12 and 13) which monitors the gain of the laser cavity.

Figure 6B:
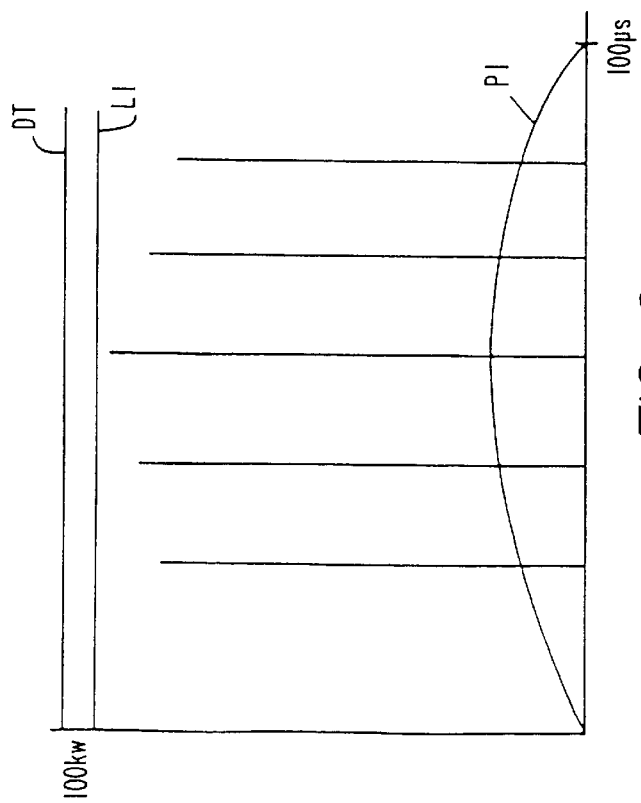
FIGS. 6($a$) and 6($b$) illustrate how output sub-pulse peak powers are controlled by varying the modulation frequency of an intracavity modulated pulsed laser to achieve compatibility with a fiber optic delivery system having a given power density damage threshold (DT). In particular, FIG. 6($a$) illustrates a low energy flashlamp pump pulse and a multi-pulsed burst laser output which may be produced therefrom, and FIG. 6($b$) illustrates a high energy flashlamp pump pulse and a multi-pulsed burst laser output which may produced therefrom.
Figure 6A:
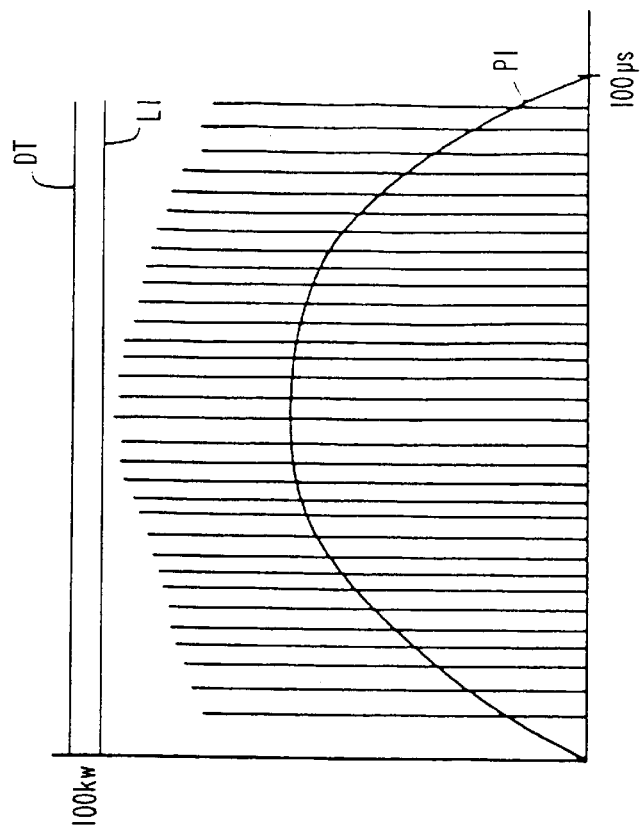

An exemplary relationship between the amount of pump pulse energy delivered by the flashlamp 4 to the Nd:YAG rod 2 and the optimum gating frequency of the RF driver signal S3 for use with a fiber optic delivery system having a given power density damage threshold DT is illustrated in FIGS. 6(a) and 6(b). As shown in FIG. 6a, if a small pump pulse, for example, a 50 mJ pulse pump, is delivered from the flashlamp 4 to the Nd:YAG rod 2, and the fiber optic damage threshold DT comprises 100 kW, the frequency of the RF gating signal S3 will be set by the microprocessor 20 to approximately 50 kHz. If on the other hand, as shown in FIG. 6(b), a large pump pulse, for example, a 320 mJ pump pulse, is delivered from the flashlamp 4 to the Nd:YAG rod 2 in the same system, the frequency of the RF gating signal S3 will be set by the microprocessor 20 to approximately 320 kHz. Thus, it will be appreciated that to maintain a given peak power threshold level L1 the optimum gating frequency of the RF driver will be increased as the amount of energy contained in each pump pulse P1 is increased, and the optimum gating frequency of the RF driver will be decreased as the amount of energy contained in each pump pulse P1 is decreased. It follows that by reprogramming the microprocessor 20 compatibility between the intracavity modulated pulsed laser 1 and virtually any fiber optic delivery system 40 may be readily achieved.

Figure 7:
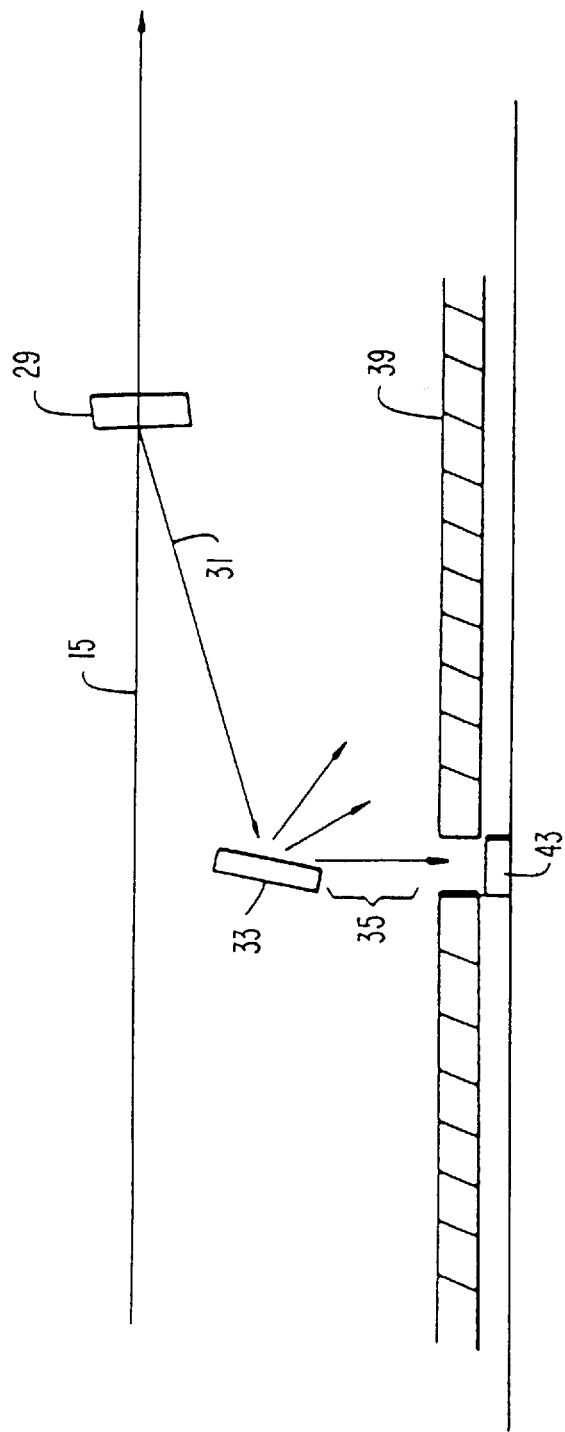
FIG. 7 is an illustration of an energy monitor in accordance with a preferred form of the present invention.
Figure 8:
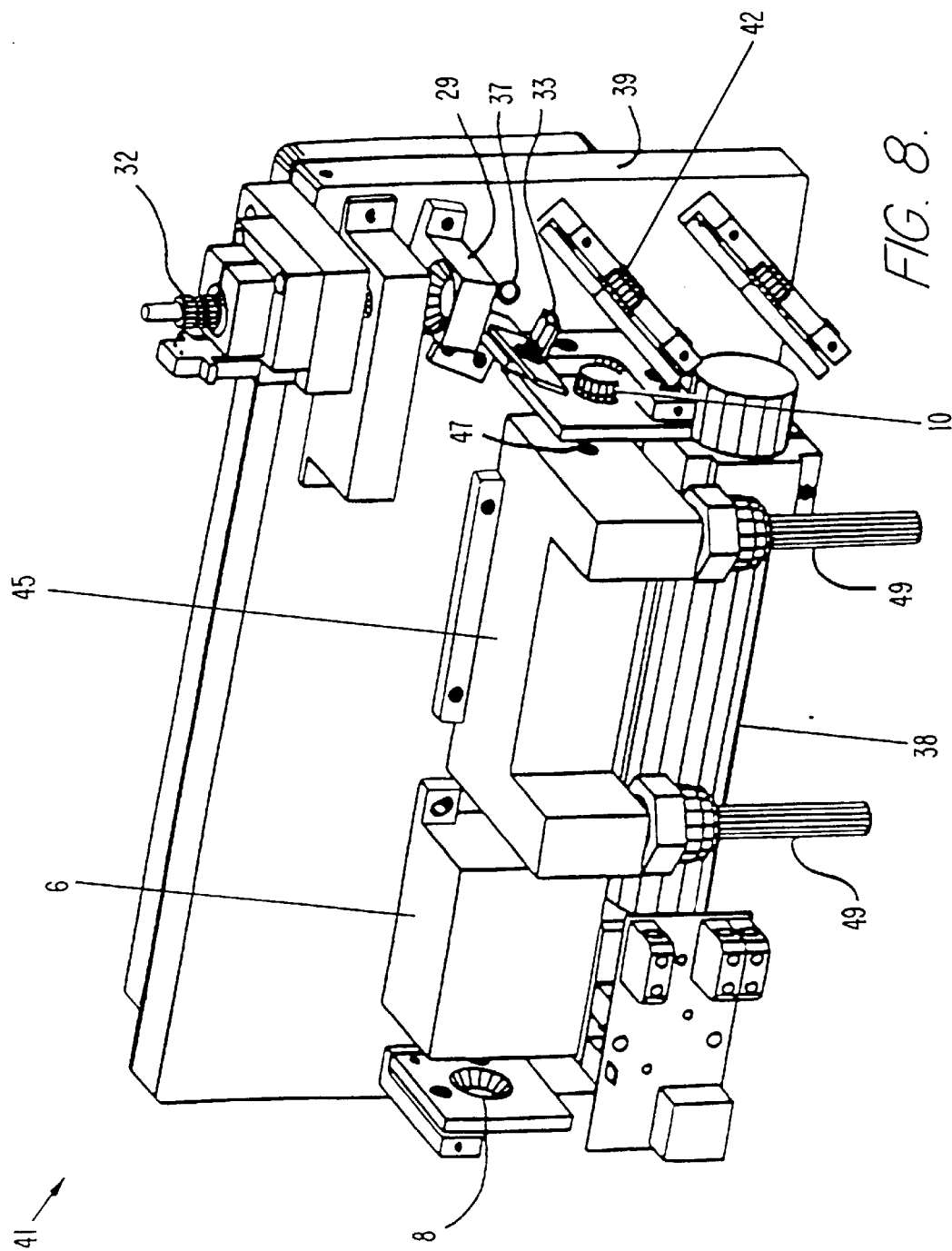
FIG. 8 is an illustration of a laser head embodying a preferred form of the present invention.

Turning again to FIG. 3, in a preferred form a beam energy monitor 27 is utilized to measure the energy contained in each output burst 15 generated by the intracavity modulated pulsed laser 1 and to provide feedback to the microprocessor 20. This enables the microprocessor 20, in response to variations which may occur over time between anticipated laser output energies and actual laser output energies, to automatically adjust the amount of energy which is delivered from the flashlamp power source 22 to the flashlamp 4 at a given pump pulse energy setting. A presently preferred energy monitor is illustrated in FIGS. 7 and 8 and comprises a shallow angle beam splitter 29, which picks off roughly 4% of the laser output beam 15 forming a sampled beam 31, and directs the sampled beam 31 toward an alumina diffuser 33. The alumina diffuser 33 diffuses the sampled beam 31 forming a diffused beam 35, and a portion of the diffused beam 35 passes through a hole 37 located in the base plate 39 of the laser head 41 and strikes a germanium diode 43. The germanium diode 43, upon being struck by the diffused beam 35, generates a current which is proportional to the intensity of the diffused beam 35, and the generated current is integrated over time and digitized by an electronic integrator (not shown). It will be noted by those skilled in the art that in this fashion the laser output beam 15 is integrated spatially by the diffuser 33 and temporally by the electronic integrator. Thus, the resulting signal S4, which is delivered to the microprocessor 20, is proportional to the laser output burst energy and is independent of pulsewidth and spatial variation.

Figure 14:
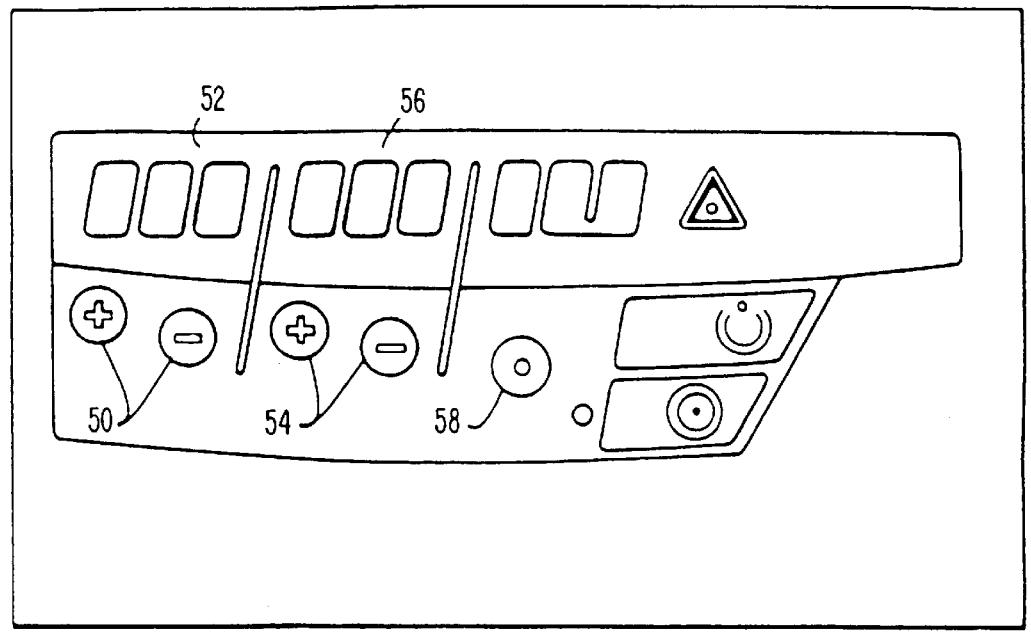
FIG. 14 is an illustration of a control panel of an intracavity modulated pulsed laser in accordance with a preferred form of the present invention.

As shown in FIGS. 3 and 14, in a preferred form a control panel 30 is provided for conveying information indicative of a desired laser output burst energy and a desired burst repetition rate to the microprocessor 20. The control panel 30 is under the control of a second microprocessor (not shown), which is coupled to the control system microprocessor 20 by conventional means.

As for the mirrors 8 and 10, it is presently preferred that the totally reflective mirror 8 comprise a convex mirror 10 having a radius of curvature of approximately 50 cm, and that the partially reflective mirror comprise a concave mirror having a radius of curvature of approximately 60 cm. The utilization of a concave/convex mirror arrangement minimizes variations in the diameter of the oscillating beam 14, as the amount of energy delivered to the Nd:YAG rod 2 by the flashlamp 4 increases. In doing so, the concave/convex mirror arrangement minimizes potential damage to the input face (not shown) of the optical fiber 34. In addition, depending upon the anticipated field of use of the intracavity modulated pulsed laser 1, it is presently preferred to coat the mirrors with a multi-layer dielectric V coating. As set forth above in the discussion concerning the AR coatings deposited over the ends of the Nd:YAG rod 2, the multi-layer dielectric V coating may be centered at any of a number of wavelengths, including 1.064 $\mu$m, 1.320 $\mu$m, and 1.440 $\mu$m. Further, for soft tissue applications, coatings centered at 1.064 $\mu$m and 1.320 $\mu$m have demonstrated utility, whereas for certain hard tissue applications, such as the vaporization of dental enamel, a coating centered at 1.320 $\mu$m is presently preferred. It should be noted, however, that the precise coating used will depend upon the particular amplification medium utilized by the system, and that for this reason the identification of particular preferred wavelengths is not intended to limit the scope of the invention in any way. With respect to the reflectivity of the mirrors 8 and 10, it is presently preferred to coat the totally reflective mirror 8 with a multi-layer dielectric V coating having a reflectivity of 99.5% or better. The partially reflective mirror should be coated with a multi-layer dielectric V coating having a reflectivity of approximately 60% if a laser output beam 15 having a wavelength of 1.064 $\mu$m is desired, and a reflectivity of 90% if a laser output beam 15 having a wavelength of 1.320 $\mu$m is desired.

Because it is anticipated that various embodiments of the intracavity modulated pulsed laser 1 will be employed in medical and dental applications, and because neither beams having a wavelength of 1.064 $\mu$m nor beams having a wavelength of 1.320 $\mu$m are visible to the human eye, in a preferred form the laser output beam 15 is combined with a visible aiming beam 36 generated by a helium neon (HeNe) laser 38 or a diode laser (not shown) using a conventional beam combining mirror 42. Thus, to aim the output beam 15 of the laser 1 at a specified tissue area a practitioner using the laser 1 may merely direct the visible aiming beam 36 at that tissue area.

As shown in FIG. 8, which provides an illustration of a laser head 41 in accordance with a preferred form of the present invention, it is presently preferred to house the flashlamp 4 and the Nd:YAG rod 2 within an optical pump chamber 45 having a pair of optical openings 47 disposed along the optical axis 12 (shown in FIGS. 1 and 3). The optical pump chamber 45, in addition to providing a housing for the Nd:YAG rod 2 and the flashlamp 4, provides a conventional coolant flow system 49 which receives coolant (e.g. water) from a cooling system (not shown) and delivers that coolant to the Nd:YAG rod 2 and the flashlamp 4. Optical pump chambers of the type disclosed herein may be purchased, for example, from Big Sky Laser in Bozeman, Mont.

Now, turning to a discussion of a number of exemplary applications for an intracavity modulated pulsed laser in accordance with a preferred form of the invention, it is presently anticipated that intracavity modulated pulsed lasers, such as those described above, will meet a number of needs in the fields of medicine and dentistry, as well as in numerous other fields and applications. Moreover, it is submitted that intracavity modulated pulsed lasers, such as those described above, will be found useful in any field or application which requires an efficient laser capable of delivering output pulses having increased or controllable peak powers.

One field, wherein it is anticipated that a laser in accordance with the present invention will prove to be quite useful, is the field of second harmonic beam generation or frequency doubling. More specifically, in laser systems second harmonic beam generation or frequency doubling may be achieved through the use of non-linear birefringent crystals. Further, the efficiency of conversion from a fundamental frequency to a second harmonic frequency is proportional to the power density of the fundamental beam and, therefore, the power of the second harmonic beam is proportional to the square of the power of the fundamental beam. Thus, to provide a practical laser device capable of generating a frequency doubled beam, it is necessary to use a laser source capable of generating a beam having a high power density. In conventional laser systems, an E-O Q-switched laser capable of producing high power laser output pulses provides the laser power source, and the output pulses generated by the E-O Q-switched laser are provided to and passed through a non-linear crystal. However, as is the case with virtually all E-O Q-switched laser systems, it is quite difficult to control the power density of the output pulses generated by such a system and, therefore, difficult to utilize such a system with conventional fiber optic delivery systems. In contrast, where an intracavity modulated pulsed laser in accordance with the present invention is utilized to generate a plurality of multi-pulsed output bursts to be provided to a non-linear crystal and to produce a plurality of frequency doubled output bursts, the peak powers of the sub-pulses comprising the output bursts may be controlled and set to a level not exceeding the threshold of an associated fiber optic delivery system.

Figure 9:
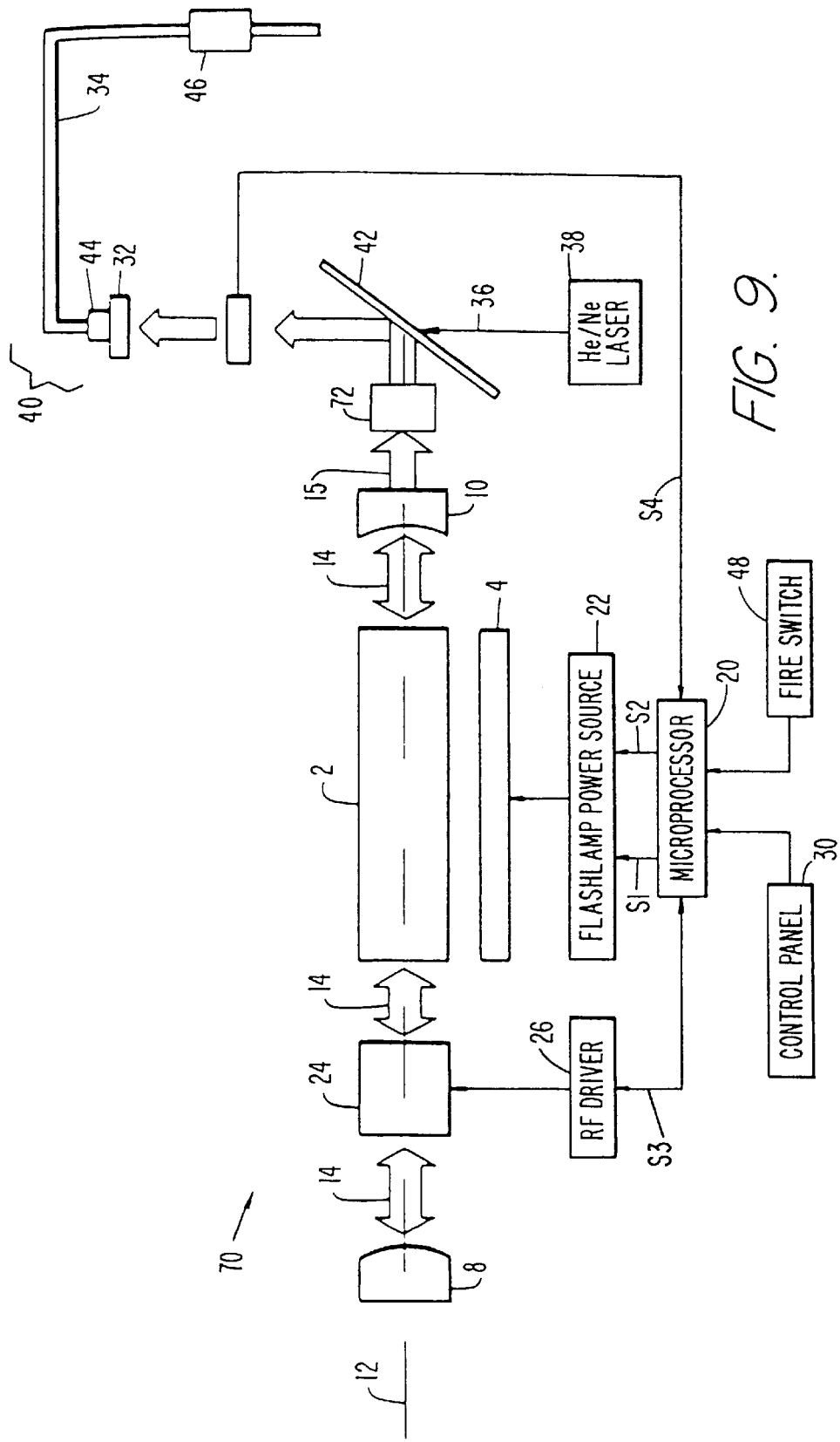
FIG. 9 is a block diagram of a frequency doubled intracavity modulated pulsed laser in accordance with the present invention.

An exemplary embodiment of an intracavity modulated pulsed laser 70 including a non-linear crystal 72 for frequency doubling is illustrated in FIG. 9. It will be noted that the intracavity modulated pulsed laser 70 illustrated in FIG. 9 and the intracavity modulated pulsed laser 1 illustrated in FIG. 3 comprise virtually the same components and function in virtually the same manner; the only difference between the two systems being that the intracavity modulated pulsed laser 70 illustrated in FIG. 9 includes a non-linear crystal 72. In a preferred form, the non-linear crystal 72 may comprise a potassium-titanyl-phosphate (KTP) crystal manufactured by Litton Industries (Airtron Division) of Morris Plains, N.J. The non-linear crystal 72 functions to convert a multi-pulsed output burst generated by the laser 1 from a wavelength of 1.064 μm to a wavelength of 532 nm (i.e. to a multi-pulsed burst having a frequency in the green spectrum).

Figure 10A:
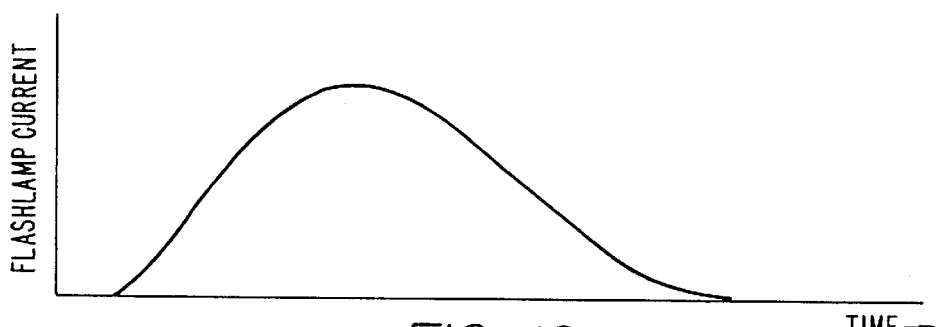
FIGS. 10($a$)–($d$) provide an illustration of several exemplary laser outputs which may be generated using a laser in accordance with one form of the present invention.
Figure 10B:
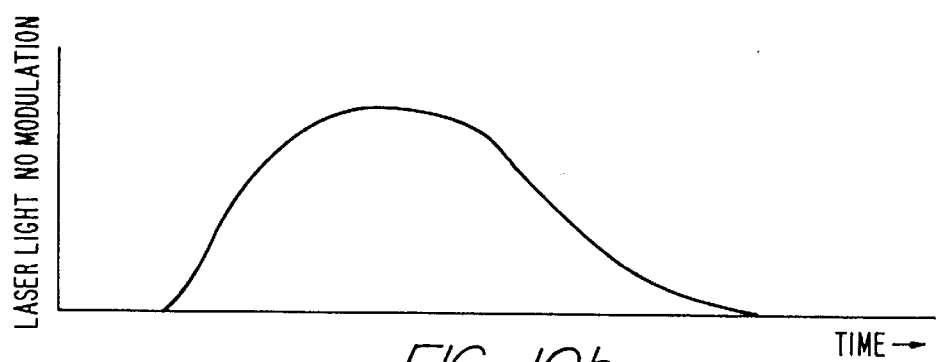
Figure 10C:
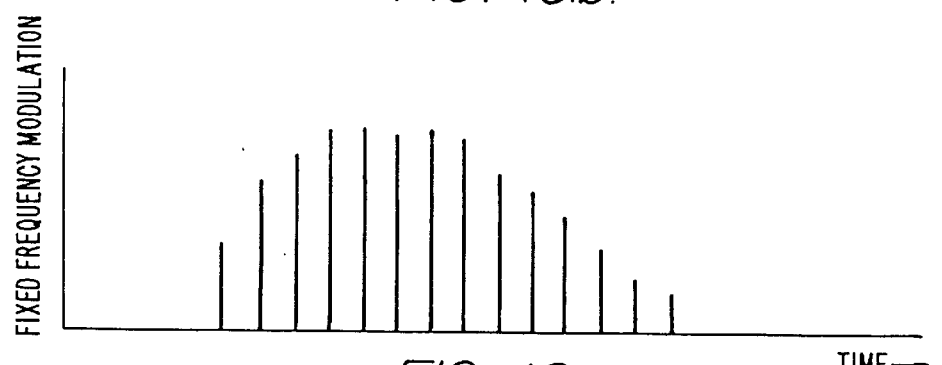
Figure 10D:
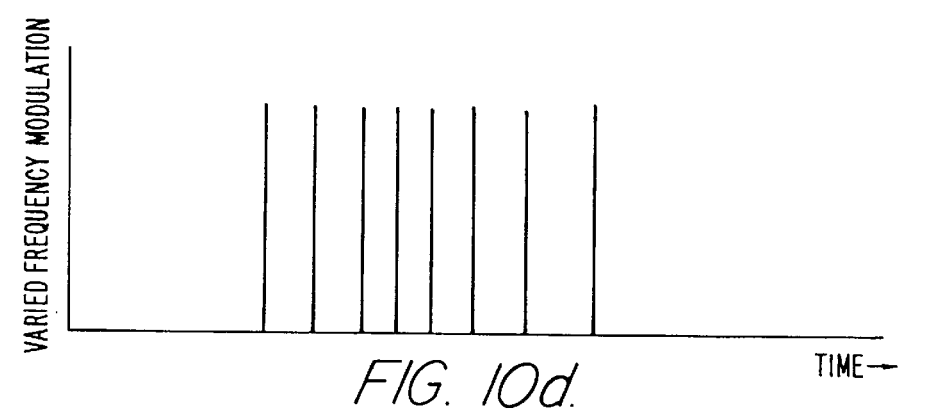

Finally, as pointed out above, the use of an intracavity modulated pulsed laser 1 as a source for a frequency doubled system provides at least one substantial advantage in addition to allowing the frequency doubled system to be readily used with conventional optical fiber delivery systems—an intracavity modulated pulsed laser 1 provides a means for generating a plurality of multi-pulsed output bursts, each comprising a plurality of sub-pulses having selected, uniform peak powers. Moreover, because the peak powers of the the sub-pulses comprising a multi-pulsed output burst may be controlled in accordance with the present invention by varying the gating frequency or gate triggering of the RF driver 26, it is possible to control the gating frequency or gate triggering of the RF driver 26 in such a fashion that the sub-pulses comprising each multi-pulsed burst output have not only controlled, but also, uniform peak powers. As an example, the relationships between a typical flashlamp pump pulse 80 and three representative laser outputs which may be produced there from are illustrated in FIGS. 10(a)–(d). If the pump pulse illustrated in FIG. 10(a) is delivered from the flashlamp 4 to the Nd:YAG rod 2, and the laser output produced thereby is not modulated, a laser output pulse similar to that illustrated in FIG. 10(b) will result. If, on the other hand, the laser output pulse is modulated by triggering the gating of the RF driver 26 at a constant frequency (i.e. by setting the gating frequency of the RF driver to a constant frequency), a laser output similar to the multi-pulsed burst illustrated in FIG. 10(c) will result. Finally, if the laser output is modulated by gating the RF driver 26 at a varying frequency during the duration of the pump pulse (i.e. at a decreased frequency while the pump pulse has a relatively low power and an increased frequency while the pump pulse has a relatively high power), a laser output similar to the multi-pulsed burst illustrated in FIG. 10(d) will result. By varying the gating frequency of the RF driver 26 over the duration of the pump pulse, it is possible to produce a multi-pulsed burst output comprising a plurality of sub-pulses having not only controllable, but also, uniform peak powers. Where a frequency doubled laser output is to be utilized, the generation of sub-pulses having uniform peak powers is highly desirable, and the use of an intracavity modulated pulsed laser system in accordance with the present invention to be quite useful as a laser source for a frequency doubled laser system.

With respect to the medical and dental fields, the utility of the Nd:YAG laser has already been demonstrated. Specifically, it has been found that for numerous applications the Nd:YAG laser can be a highly effective tool. In part, this is because the 1.064 μm beam which is produced by the Nd:YAG laser may be carried with minimal energy losses by standard optical fibers. The difficulty which has been encountered by prior art systems, however, is that those systems have been unable to maintain a high average power output, while at the same time delivering laser output pulses which have increased peak powers and may be transmitted using conventional fiber optic delivery systems. For this reason treatment, including tissue vaporization and ablation, using the systems of the prior art requires substantial time. In contrast, because an intracavity modulated pulsed laser maintains a high average power output while at the same time providing laser output pulses having increased peak powers, tissue vaporization and ablation, for example, using an intracavity modulated pulsed laser proceeds at a much more rapid rate. In addition, because the intracavity modulated pulsed laser delivers multi-pulsed energy bursts to an area of tissue to be treated, thermal damage to adjacent tissues is minimized.

As set forth above, when using an intracavity modulated pulsed laser for treating hard and soft tissue disorders, it is preferable to couple the intracavity modulated pulsed laser to a fiber optic delivery system 40. Fiber optic delivery systems 40 generally comprise a optical fiber 34 which is coupled to a standard SMA 905 connector 44 at one end, and which has a conventional laser hand piece 46 coupled to the other end. The connector 44 is adapted to engage the fiber coupler 32 (shown in FIGS. 3 and 8) such that both the aiming beam 36 and the laser output beam 15 may be carried by the fiber 34 to the hand piece 46. Hand pieces 46 are generally of one of two types, contact and non-contact. If a non-contact hand piece is utilized, the beams 15 and 36 are generally deflected at a prescribed angle and focused at a prescribed distance from the hand piece 46 by conventional means. To aim the laser output beam 15 using a non-contact handpiece a practitioner must only direct the visible aiming beam 36 toward a prescribed tissue area. Once this is accomplished, the laser 1 may be "fired", activated by depressing the "fire" switch 48. If, on the other hand, a contact hand piece is utilized, the beams 15 and 36 will be delivered to a contact tip (not shown), and when the contact tip is placed in contact with a prescribed tissue area, the beams 15 and 36 will be delivered directly to that tissue area at the point of contact. Thus, when using a hand piece of the contact variety, the practitioner may commence firing the laser either prior to or after bring the contact tip into contact with a desired tissue area.

Figure 11:
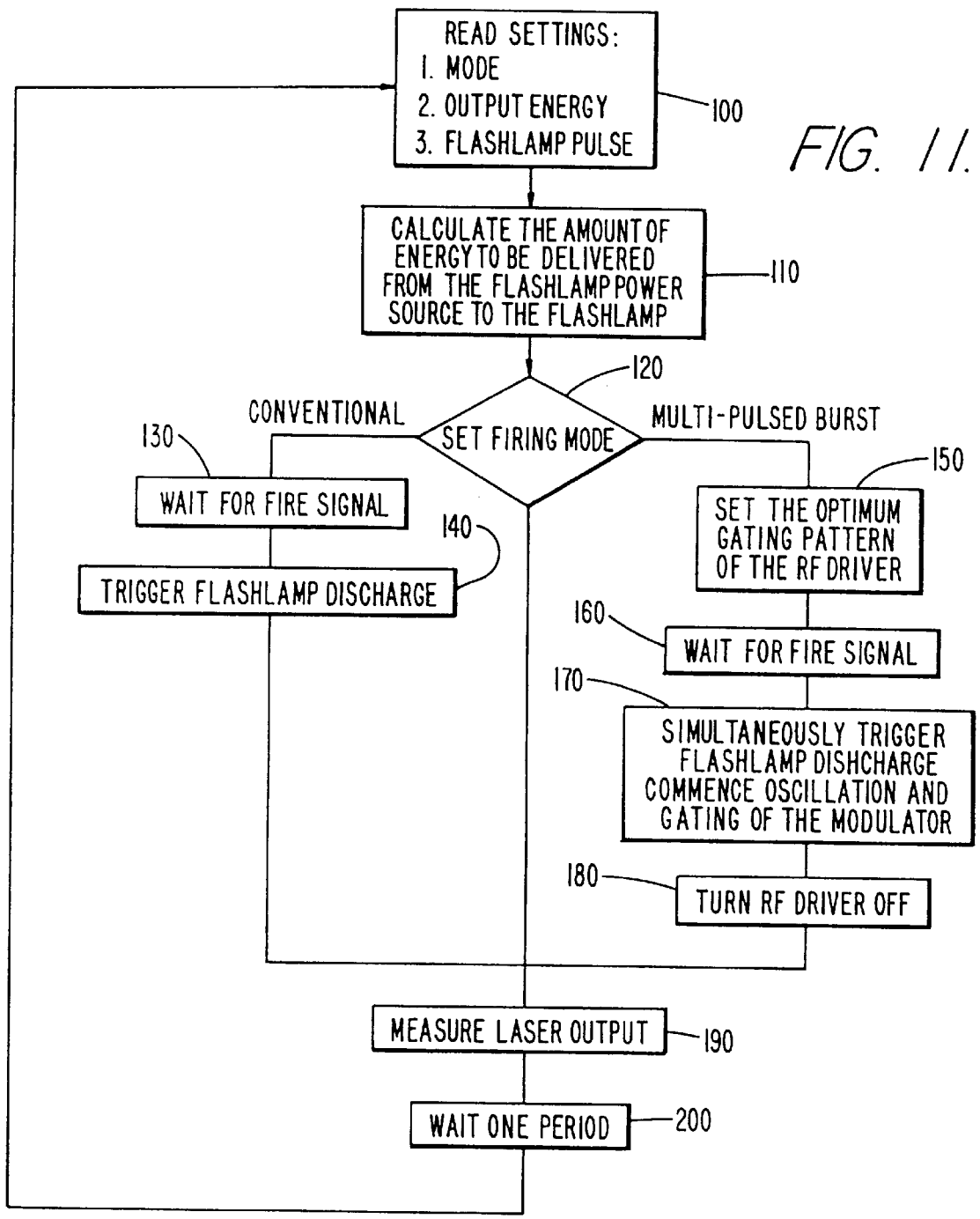
FIG. 11 is a flowchart illustrating the sequence of functions performed by a microprocessor in controlling an intracavity modulated pulsed laser in accordance with a preferred form of the present invention.

In each instance of firing, in a preferred form the microprocessor 20 will proceed through the steps set forth in FIG. 11. Specifically, the microprocessor 20 will perform an initialization step (100) by reading the mode setting, the output energy setting, and the flashlamp pulse repetition rate setting, all of which are manually entered by the operator. The mode setting determines whether a conventional pulsed laser output or a multi-pulsed burst output will be delivered by the intracavity modulated pulsed laser. The output energy setting determines the amount of energy which will be delivered by the laser 1 within each conventional output pulse or each multi-pulsed output burst (depending upon the mode setting). The flashlamp pulse repetition rate setting determines the number of flashlamp pulses per second which will be delivered by the flashlamp 4 to the Nd:YAG rod 2 during continuously repeated firings of the laser.

After initialization (100), the microprocessor 20 will perform flashlamp energy calculation step (110). Specifically, the microprocessor calculates and sets the amount of energy to be delivered from the flashlamp power source 22 to the flashlamp 4. This calculation is performed based on information stored in a look-up table, which is stored in the memory of the microprocessor 20. The information in the look-up table is based on a correction factor which is determined based on the previous output energy setting and the actual amount of energy delivered by the laser 1 within each conventional output pulse or each multi-pulsed burst as the case may be. The actual amount of energy delivered by the laser 1 is measured by the energy monitor 27. In this fashion, the microprocessor 20 compensates for changes in laser efficiency which will occur over time.

Next, the microprocessor 20 will set the firing mode of the laser (120) to a conventional or a multi-pulsed burst setting in accordance with previously read mode information. When conventional mode has been selected, the microprocessor 20 will wait to receive a fire signal from the fire switch 48 (130), and after receiving the fire signal from the fire switch 48, the microprocessor will trigger a flashlamp pulse (140). If the multi-pulsed burst output mode has been selected, the microprocessor 20 will set the optimum gating frequency, or gating sequence, of the RF driver signal S3 (150), and wait for a fire signal from the fire switch 48 (160). Upon receiving a fire signal from the fire switch 48, the microprocessor 20 will, as shown in FIG. 5, simultaneously trigger a flashlamp pulse and commence the oscillation and gating of the modulator 6 (170). After the flashlamp pulse has passed, the microprocessor 20 will turn off the oscillation and gating of the modulator 6 (180). In either mode, the laser output energy will be measured by the energy monitor 27, and a signal 54 indicative of the laser output energy will be provided by the energy monitor 27 to the microprocessor 20 (190). The microprocessor 20 will then wait for one pulse period (step 200) and repeat the sequence.

Figure 12:
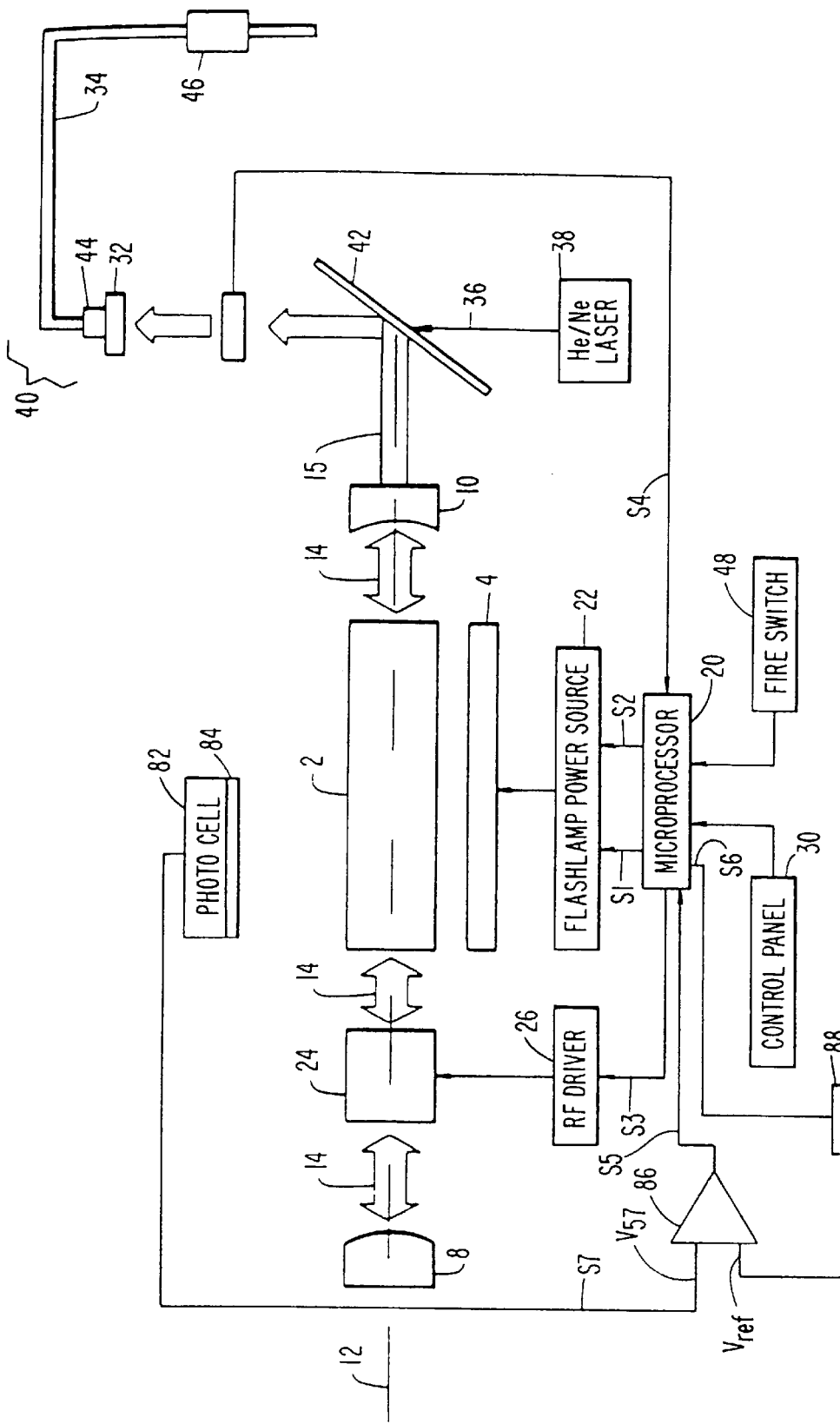
FIG. 12 is a block diagram of an intracavity modulated pulsed laser employing a fluorescence feedback circuit in accordance with the present invention.
Figure 13:
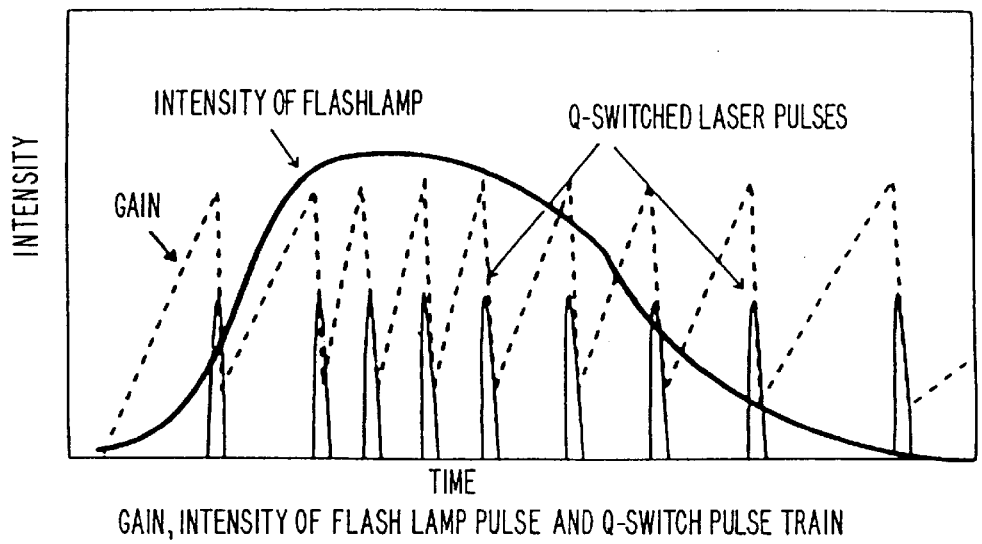
FIG. 13 illustrates how sub-pulse peak powers are controlled using the fluorescence feedback circuit illustrated in FIG. 12.

Turning now also to FIGS. 12 and 13, in an alternative mode, the gating of the RF driver signal S3 may be controlled using a fluorescence feedback circuit. An intracavity modulated pulsed laser 80 incorporating a fluorescence feedback circuit 82, 84 and 86 is illustrated in FIG. 12. In a preferred form, the fluorescence feedback circuit may comprise, for example, a germanium photo-electric cell 82 manufactured by Germanium Power Devices (part number GM5) of Andover, Mass.; a 1.06 $\mu$m narrow pass filter 84 manufactured by Corion (part number SD 4-1064-F) of Hollister, Mass.; and a comparator 86. The photo-electric cell 82 is disposed within the pump chamber of the laser 80 adjacent (or, stated differently, in the vicinity of) the Nd:YAG rod 2. The narrow pass filter 84 is mounted to the photoelectric cell in a conventional fashion, and the photo-electric cell 82 is electrically coupled to one input of the comparator 86 which, in turn, is electrically coupled to the microprocessor 20.

When a fluorescence feedback control system is utilized in an intracavity modulated pulsed laser in accordance with the present invention, the microprocessor 20 triggers the flashlamp pulse discharges and commences the oscillation of the modulator 6 (i.e. enable the delivery of the RF driver signal S3 to the RF driver 26). However, the gating of the modulator 6 and, more particularly, the gating of the RF driver signal S3 is controlled in real-time, through the microprocessor 20, by the fluorescence feedback circuit 82, 84, and 86 which monitors the gain of the laser cavity and delivers a signal S5 to the microprocessor 20 when the gain of the laser cavity reaches a prescribed level (i.e. when the fluorescence of the Nd:YAG rod 2 reaches a prescribed level). Upon receiving the signal S5 from the comparator 86 (indicating that the gain of the laser cavity has reached a predetermined level) the microprocessor 20 will gate the signal S3 being provided to the RF driver 26 for a period on the order of 2 $\mu$s, and an output pulse (or sub-pulse, as the case may be) will be emitted by the laser 80. This process will continue over the duration of each pump pulse provided by the flashlamp 4, enabling the laser 80, in response to each pump pulse provided by the flashlamp 4, to produce a multi-pulsed output burst comprising a plurality of sub-pulses having predetermined, uniform peak powers. The microprocessor 20 may be programmed to adjust the reference voltage $V_{ref}$ of the comparator 86 in a conventional fashion and, the microprocessor 20 may be used to select the gain value at which the signal S5 will be sent to the microprocessor 20 by the comparator 86.

The function of the feedback circuit 82, 84 and 86 may be explained as follows. The amplitude and width of a Q-switched pulse for a fixed laser cavity geometry depends on the gain in the cavity and, for a fixed cavity geometry, the gain is dependent on the number of excited Nd ions in the Nd:YAG rod 2. The rate of spontaneous emission and fluorescence of the Nd:YAG rod 2 are also proportional to the number of excited ions. Thus, by monitoring the fluorescence of the Nd:YAG rod 2 and, in doing so, the rate of spontaneous emission from the upper laser level, the gain in the cavity can be monitored. In the laser 80 illustrated in FIG. 12, the photo-electric cell 82 generates a signal S7, i.e. a voltage $V_{S7}$, which is proportional to the detected fluorescence of the ND:YAG rod 2. Signal S7 is provided to one input of the comparator 86 and, when compared to a reference voltage $V_{ref}$ (determined by signal S6, which is provided to the comparator 86 through D/A converter 88), determines the output state of the comparator 86. For example, when voltage $V_{S7}$ exceeds the reference voltage $V_{ref}$, the output (Signal S5) will be high; and when voltage $V_{S7}$ does not exceed the reference voltage $V_{ref}$, the output (Signal S5) will be low. Thus, when the rate of spontaneous emission reaches a critical value, and signal S5 goes high, the modulator 6 will be gated, i.e., the Q-switch will be opened for approximately 2 μs, and a pulse (or, more appropriately, a sub-pulse) will be emitted by the laser 80.

When a fluorescence feedback circuit is used in accordance with the present invention, the multi-pulsed bursts emitted by the laser 80 will be highly uniform in amplitude and duration. This is so because the gain of the laser cavity will be essentially equal for each sub-pulse comprising the emitted multi-pulsed bursts. However, by the reference voltage $V_{ref}$ over the duration of a flashlamp pulse, the microprocessor 20 may set the peak power of each sub-pulse comprising a given output burst to virtually any desired level within the operating parameters of the system. These unique capabilities are particularly advantageous because, using these capabilities, automatic compensation may be provided below the pulse repetition rate display 56 on the control panel 30. The multi-pulsed burst mode may be selected by depressing a button 58 labeled accordingly. In the presently preferred form, the burst energy setting may be set between 30 mJ and 320 mJ, and the flashlamp pulse repetition rate may be set between 10 Hz and 100 Hz.

Assuming that a pump pulse having a duration of approximately 100 μs is delivered by the flashlamp 4 to the Nd:YAG rod 2, suggested burst or pulse energy settings, pulse repetition rate settings, mode settings, and RF gating 10 frequencies (if applicable) for various soft tissue applications (including incision, excision, ablation, and coagulation) are set forth in Table 1.

TABLE 1

| APPLICATION | MODE | ENERGY (mJ) | RATE (Hz) | AVG POWER (W) | RF GATING FREQUENCY |
|---|---|---|---|---|---|
| Incision | Multi-pulsed | 30–200 | 20–50 | 3–10 | 30–200 kHz |
|  | Conventional | 30–200 | 20–50 | 3–10 | Off |
| Excision | Multi-pulsed | 30–200 | 20–50 | 3–10 | 30–200 kHz |
|  | Conventional | 30–200 | 20–50 | 3–10 | Off |
| Ablation | Multi-pulsed | 30–100 | 50–100 | 3–10 | 30–100 kHz |
|  | Conventional | 30–100 | 50–100 | 3–10 | Off |
| Coagulation | Conventional | 30–100 | 30–100 | 3–10 | Off | for many changes, which may occur over time, in the operating characteristics of the laser system 80. For example, compensation for changes resulting from aging of the flashlamp 4 may be automatically provided.

The fluorescence feedback circuit 82, 84 and 86 need not necessarily provide a gating signal S5 to the microprocessor Assuming that a pump pulse having a duration of approximately 100 μs is delivered by the flashlamp 4 to the Nd:YAG rod 2, suggested burst or pulse energy settings, flashlamp pulse repetition rate settings, pulse mode settings, and RF gating frequencies for hard tissue ablation are set forth in Table 2.

TABLE 2

| APPLICATION | MODE | ENERGY (mJ) | RATE (Hz) | AVG POWER (W) | RF GATING FREQUENCY (kHz) |
|---|---|---|---|---|---|
| Ablation | Multi-pulsed | 100–320 | 30–100 | 3–10 | 100–320 |
| Ablation | Conventional | 200–320 | 30–100 | 6–10 | Off |

20. The gating signal S5 might be provided directly to the RF driver 26. In such an embodiment, the microprocessor would enable the RF driver 26 (i.e. commence the oscillation of the A-O Q-switch 24), but the gating of the oscillation of the A-O Q-switch would be controlled by the provision of the gating signal S5 directly to the RF driver 26.

Turning now also to FIG. 14, in a preferred form the desired laser output burst energy setting and flashlamp pulse repetition rate setting are conveyed to the microprocessor 20 by the control panel 30. As shown in FIG. 14, the burst energy setting may be adjusted by manipulating a pair of buttons 50 labeled (+) and (−) which are located just below the pulse energy display 52 on the control panel 30. The pulse repetition rate may be adjusted by manipulating a pair of buttons 54 labeled (+) and (−) which are located just Finally, with respect to certain hard tissue applications and, in particular, with respect to the ablation of hard tissue, i.e., the drilling of holes in dental enamel, it appears, based on experimentation to date, that it may be preferable to utilize a beam having a wavelength of 1.320 μm. However, because not all fibers are capable of efficiently carrying a beam having a wavelength of 1.320 μm, it is preferable to utilize a low OH⁻ fiber to carry the laser output beam 15 to the hand piece 46. Fibers of this type are available, for example, from Poly Micro Technologies, Inc., of Phoenix, Ariz., and model number FIP 200/220/240 is presently preferred.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A method for generating a laser output comprising a plurality of multi-pulsed bursts having variably controllable peak powers, said method comprising the steps of:

intermittently delivering pulses of pump energy to an amplification medium disposed along an optical axis between a totally reflective mirror and a partially reflective mirror;

allowing a beam to oscillate between said mirrors upon the delivery of each pulse of pump energy to said amplification medium;

modulating the oscillation of said beam between said mirrors at a controllable modulation frequency such that a laser output comprising a multi-pulsed burst results from the delivery of each pulse of energy to said amplification medium.

2. The method of claim 1 wherein said step of modulating the oscillating of said beam is performed by an acousto-optical Q-switch driven by an RF driver under microprocessor control.

3. The method of claim 1 wherein said amplification medium comprises a Nd:YAG rod, and wherein a flash lamp delivers said pulses of energy to said Nd:YAG rod.

4. A method for generating a laser output, said method comprising the steps of:

generating multiple Q-switched output sub-pulses during a single flash of a pulsed pumping source, and adjusting a temporal spacing between said output sub-pulses to achieve predetermined sub-pulse power levels of a resulting laser output.

5. The method of claim 4, wherein said power levels of said sub-pulses are substantially equal and below a damage threshold of a laser output delivery system.

6. The method of claim 5, wherein said laser output delivery system comprises a fiber optic laser output delivery system.

7. The method of claim 4, wherein said step of adjusting a temporal spacing between said output sub-pulses also achieves a maximum average power of said laser output.

* * * * *